No. 733,662. Patented July 14, 1903.

UNITED STATES PATENT OFFICE.

HJALMAR LANGE, OF VESTERÅS, SWEDEN.

SOLDERING OF ALUMINIUM.

SPECIFICATION forming part of Letters Patent No. 733,662, dated July 14, 1903.

Application filed August 15, 1900. Serial No. 26,923. (No specimens.)

*To all whom it may concern:*

Be it known that I, HJALMAR LANGE, civil engineer assistant, of 1 Kungsdal, Vesterås, in the Kingdom of Sweden, have invented certain new and useful Improvements Relating to the Soldering of Aluminium, of which the following is a specification.

As is well known, soldering of aluminium presents considerable difficulties owing to the chemical peculiarities of the oxid of aluminium and to the great specific heat and thermal conductivity of the metal.

By means of the soldering method forming the object of this invention the hitherto-experienced drawbacks are obviated. The characteristic features of this method consist in the soldering being effected in two operations without the use of acid or any other flux and by means of soldering metals having approximately the same electropositive character as the aluminium itself for the purpose of avoiding any galvanic effects at the place of soldering.

The method consists of the soldering-surfaces being first in any well-known manner cleaned by filing. A thin layer of zinc is then spread upon the clean aluminium surfaces under the application of heat—for instance, by using a soldering-lamp, electric current, or the like and simply rubbing a strip of zinc along the surfaces. A suitably thick and even layer of the aluminium-zinc alloy is now spread on the soldering-surfaces, which are then pressed against each other and heated until the alloy begins to melt, while impurities and superfluous soldering material are removed by rubbing the two parts against each other, whereupon the soldering is finished.

The above-mentioned alloy is made by melting together about one part of aluminium with two and one-half parts of zinc.

The above-described soldering forms an aluminious joint that intimately combines with the aluminium of the soldering-surfaces, so that the soldering, chemically as well as mechanically—for instance, as regards forging—essentially has the same properties as the aluminium outside the soldered point.

Having now particularly described and ascertained the nature of this said invention and in what manner the same is to be performed, I declare that what I claim is—

The herein-described process of soldering aluminium which consists in mechanically cleaning the surfaces, heating the same, covering said surfaces with a layer of molten zinc, then covering the zinc-coated surface with a layer of molten aluminium-zinc alloy, and then finally holding said surfaces in contact while subjected to sufficient heat to melt the alloy, substantially as described.

In testimony that I claim the foregoing as my invention I have signed my name in presence of two subscribing witnesses.

HJALMAR LANGE.

Witnesses:
 ERNEST BOUTARD,
 J. C. JACOBSEN.